United States Patent [19]

Pieters et al.

[11] Patent Number: 4,837,818
[45] Date of Patent: Jun. 6, 1989

[54] TELECOMMUNICATION LINE CIRCUIT

[75] Inventors: Jozef F. P. Pieters, LebbekeWieze; Pierre-Paul F. M. Marie Guebels, Edegem, both of Belgium

[73] Assignee: Alcatel N.V., Amsterdam, Netherlands

[21] Appl. No.: 852,609

[22] Filed: Apr. 16, 1986

[30] Foreign Application Priority Data

May 17, 1985 [EP] European Pat. Off. ......... 85200774

[51] Int. Cl.[4] .................. H04M 3/27; H04M 19/02
[52] U.S. Cl. .................................. 379/252; 379/382; 379/405
[58] Field of Search ............... 379/251, 252, 377, 405, 379/413, 345, 387, 385, 380, 382, 399, 398, 338, 400

[56] References Cited

U.S. PATENT DOCUMENTS

| | | | |
|---|---|---|---|
| 3,622,709 | 11/1971 | Tjaden | 379/380 |
| 4,317,963 | 3/1982 | Chea, Jr. | 379/413 X |
| 4,396,805 | 8/1983 | Wagner | 379/252 |
| 4,514,595 | 4/1985 | Rosenbaum et al. | 379/385 |
| 4,532,381 | 7/1985 | Rosenbaum et al. | 379/377 X |
| 4,539,438 | 9/1985 | Rosenbaum et al. | 379/377 |
| 4,540,852 | 9/1985 | Albouy et al. | 379/405 X |
| 4,598,173 | 7/1986 | Chea, Jr. et al. | 379/413 X |

FOREIGN PATENT DOCUMENTS 898049 4/1984 Belgium .
2324181 4/1977 France .

OTHER PUBLICATIONS

AM 7950, Advanced Micro Devices, Advanced Information Jun. 1984, Sep. 1985.
IBM Technical Disclosure Bulletin, "Trip Detecting Circuit" by M. Ferry vol. 20, No. 3, Aug. 1977 (pp. 1045–1046).
Electrical Communication, vol. 44, No. 4, 1969, "Balanced Electronic Receiver for Loop Signaling" (pp. 340–347).

*Primary Examiner*—Jin F. Ng
*Assistant Examiner*—Randall S. Vaas
*Attorney, Agent, or Firm*—Christie, Parker & Hale

[57] ABSTRACT

Telecommunication line circuit including a Herter bridge with a first pair of terminals coupled to a bidirectional 2-wire line, a second pair of terminals coupled to an exchange, and a third pair of terminals where longitudinal currents are eliminated from sensed signals, as well as a ringing generator that may be coupled across the second pair of terminals which is coupled to a receive leg of a 4-wire exchange circuit and, through switching means to a ringing generator while the third pair of terminals is coupled to a transmit leg of the 4-wire exchange circuit.

11 Claims, 2 Drawing Sheets

TELECOMMUNICATION LINE CIRCUIT

BACKGROUND OF THE INVENTION

1. Field of the Invention

The invention relates to a telecommunication line circuit including a Herter bridge with a first pair of terminals coupled to a bidirectional 2-wire line, a second pair of terminals coupled to an exchange and a third pair of terminals where longitudinal currents are eliminated from sensed signals, as well as a ringing generator that may be coupled across the second pair of terminals.

2. Description of the Prior Art

Such a line circuit is known from the U.S. Pat. No. 4,292,473 and makes use of the property of a Herter bridge to avoid the undesirable effects of longitudinal currents. As disclosed for instance in the U.S. Pat. Nos. 3,525,816 and 3,748,395, a Herter bridge (appearing in FIG. 2 of the present application) basically includes two high resistance potentiometers (R2+R3, R5+R4) cross-coupled between opposite terminals of two resistances (R0, R1) of low value, respectively interconnecting the first/second terminal of the first pair with the corresponding first/second terminal of the second pair, the tapping points of the potentiometers constituting the third pair of terminals. Thus, it is essentially a hexapole network with six resistances in a closed ring, (R0, R4, R5, R1, R3, and R2) and apart from being able to avoid the effects of longitudinal currents, it is also a bridge which can be balanced for a particular resistance value across the first pair of terminals (STB, SRA), i.e. the line loop. This means that an input signal fed to the second pair of terminals (STA, SRB), i.e. the exchange side, will not produce any output signal across the third pair of terminals (A, B), i.e. the detector, when such a particular or critical resistance is branched across the first pair of terminals.

This has been used to advantage in order to detect an open or closed line loop since by designing the elements of the Herter bridge so that it is balanced for a critical loop resistance value well below that of an open loop, i.e. a very high resistance, and well above that of a closed loop, i.e. a very low one, such changes of condition in the loop are readily detected by a change of polarity of the output signal at the third pair of terminals.

Calling v this output signal (between B and A), it can be expressed as the algebraic sum of the potential drops across R4, R0 and R2 in series as well as those across R5, R1 and R3 in series. This enables v to be expressed as a linear function of four currents (as shown in FIG. 2): i0 circulating through R0 towards the loop, $i+i'$ from R0 into the loop, $i-i'$, into R1 from the loop and i1 through R1 away from the loop. Evidently, $i'$ represents the undesirable longitudinal current and since the $i'$ component of v is found to be equal to half the potential drop across a resistance of value $R4-R5+R2-R3$, such longitudinal currents will be eliminated from v, the detected signal, provided $$r = R2 - R3 = R5 - R4 \quad (1)$$

if the potentiometers are identical i.e. R2=R5 and R3=R4 so as to avoid i being involved in another relation including also i0, $i'0$ and $i'$. Then v is independent of $i'$, i.e.

$$2v = (r-R0)i0 + (r-R1)i1 - 2ri \quad (2)$$

On the other hand, with r=0, i.e. R2 and R3=R4=R5, v is solely a linear function of i0 and i1.

When (1) is satisfied, the critical value R of the loop resistance for which the Herter bridge, immune longitudinal currents, is balanced, can be found by equating the potential drop across R ($i'=0$) to the algebraic sum of the potential drops across R4, R5 and R1 in series as well as to that across R0, R2 and R3 in series and for v equal to zero. This enables R to be expressed as $$R = \frac{R'0R'1(R0 + R1) + R0R1(R'0 + R'1) - r(2R0R1 + R'0R1 + R0R'1)}{(r - R0)(R'0 + R1) + (r - R1)(R0 + R'1)} \quad (3)$$

where $$R'0 = R2 + R3 \quad (4)$$

$$R'1 = R4 + R5 \quad (4')$$

In practice, the Herter bridge usually has not only a symmetrical topology but also symmetrical values since R0/R1, as well as R2/R5 and R3/R4 will be equal in pairs to secure a substantial longitudinal balance. This particular symmetrical case, entailing also $R'0=R'1$, leads to a much simpler expression for the critical value R, i.e.

$$R = \frac{R'0 - r}{r - R0} \cdot R0 = \frac{2R3}{R2 - R3 - R0} \cdot R0 \quad (3')$$

It shows that, if only positive resistance values are considered for the various elements, the bridge can only be in a balanced condition when R2=R5 is larger than half the total resistance of each potentio-meter, the latter being usually chosen relatively high and even quite high in some applications, e.g. 240 kilo-ohms, in order not to waste energy in the detecting process, whereas R0=R1, i.e. the series feed resistances, are usually chosen quite low, e.g. 50 ohms, in order not to waste energy in feeding a substation through the line loop from the exchange.

For symmetrical values and with r=0, i.e. when R2=R3=R4=R5, (3') shows that a balance cannot be secured for positive values of both R and R'0 although in practice, with R0=R1 being much smaller than R2=R3=R4=R5, one has very nearly a simple balanced Wheatstone bridge involving these last four resistances when R is infinite, i.e. for an open loop. At the other end of the range, when R is zero, i.e. for a closed loop, the potentials at the two output terminals will respectively be of the order of ¾ and ¼ of the input voltage across the second pair of terminals.

The above considerations already indicate that various designs of the 6-resistance Herter bridge may all eliminate the longitudinal current component in the output, but additional variants involving a modified topology are still possible while retaining the general properties outlined, including the bridge effect. For instance, in the U.S. Pat. No. 3,622,709 one has added a seventh resistance linking one of the terminals of the third pair (B) to that terminal of the second pair (SRA) to which it is not connected by a resistance (such as R4 to STB) in the 6-resistance bridge.

These 6- and 7-resistance versions appear for instance in the French patent published under No. 2,324,181 and in the U.S. Pat. No. 4,103,112 respectively, and there the Herter bridge is used to detect an off-hook condition during ringing in a line circuit including a transformer with a split winding on the line side, the supervision signal at the output of the Herter bridge being unaffected by longitudinal currents.

Further line circuits using a Herter bridge in connection with ringing are also to be found in other patents such as the Belgian Pat. No. 846 034, British Pat. No. 1 511 767 as well as European patent application published under No. 0,096,473.

In the more recent types of telephone exchanges one resorts to the use of AC and DC loop impedance synthesis in order to effectively produce AC impedances and DC resistances of suitable characteristics and values from the two low-valued series feed resistances (R0, R1). Reference may for instance be made to U.S. Pat. Nos. 4,315,106, 4,317,963, and 4,387,273 as well as to European patent application published under No. 0,112,731. In this last application, a Herter bridge is used for dial pulse detection while in the embodiments of FIG. 8 of U.S. Pat. No. 4,317,963 and of FIG. 7 of U.S. Pat. No. 4,387,273, one has a Herter bridge with two cascaded grounded operational amplifiers in the feedback loop.

SUMMARY OF THE INVENTION

The invention is based on the insight that it is possible to use the same Herter bridge to couple the receive and transmit legs of a 4-wire exchange connection to the bidirectional telecommunication subscriber line, with the detector output of the bridge feeding not only the transmit leg, as well as the AC and DC impedance synthesis loops, but also the loop supervision means, whether ringing is present or not. In such a circuit, the necessary amount of loss to decouple the receive and transmit legs of the 4-wire exchange circuit will be obtained by additional echo cancelling means linked to both legs, e.g. using hybrid circuits coupling the receive and transmit legs of the 4-wire circuit to the 2-wire bidirectional line.

In accordance with a first characteristic of the invention, the second pair of terminals is coupled to a receive leg of a 4-wire exchange circuit and, through switching means, to the ringing generator while the third pair of terminals is coupled to a transmit leg of the 4-wire exchange circuit.

Thus, the ringing generator can be connected in parallel with the receive leg across the second pair of terminals connected to the exchange and provide ringing signals on the loop through the Herter bridge while this ringing signal with an AC content, as well as DC signals, can be supervised at the third pair of terminals.

In accordance with a further characteristic of the invention, the third pair of terminals of the Herter bridge is also coupled to AC/DC feedback circuits enabling to synthesize desired characteristics and values of AC impedances and DC resistances from series feed resistances (R0, R1) part of the Herter bridge as well as of the feedback circuits.

In accordance with yet another characteristic of the invention, the Herter bridge is designed so that the output at the third pair of terminals contains only components proportional to voltages across the series feed resistances.

Thus, referring to the above equation (2), the particular significance of the special case of $r=0$ for the present application will now be appreciated since the output voltage v is then solely a function of the potential drops across the series feed resistances (R0, R1) used for impedance and resistance synthesis. With symmetry, i.e. all four resistances (R2, R3, R4, R5) of the two potentiometers equal to the same value, equation (3') indicates that the bridge cannot be balanced. Indeed, a low value of r with respect to $R'=R'1$, i.e. the total resistance of each potentiometer as defined by equations (4) and (4'), implies that R, the line impedance for which the bridge is balanced is very high. This means that on the contrary, for ringing signals for instance, applied across the second pair of terminals (STA, SRB) of the bridge, with the subscriber line affording a relatively low impedance across the first pair of terminals, either through the subset ringing capacitor or when it is off-hook, the bridge will be largely unbalanced since R is close to zero thereby providing an output voltage of the order of half the input voltage.

The present invention also relates to a telecommunication line circuit including a pair of operational line amplifiers able to supply DC feed signals as well as AC signals, e.g. speech, received on a receive leg to a telecommunication station through respective feed resistances and respective line conductors of a telecommunication line, said station being able to generate AC signals, e.g. speech, and to open or close a DC loop between said line conductors, a sensing circuit including said feed resistances and able to sense signals on said feed resistances and to generate on its output a sensed output signal which is capacitively coupled to said line amplifiers and also coupled to a transmission leg and to a DC level detection circuit, said operating amplifiers and said sensing circuit forming an impedance synthesis circuit.

Such a telecommunication line circuit is already known from the Belgian Pat. No. 898,049 but is not adapted to detect a line loop closure during a ringing phase, i.e. when a high voltage AC/DC ringing signal is supplied to the line. To do so, a separate sensing circuit and a separate DC level detection circuit are required for such a ringing signal.

A further object of the present invention is to provide a telecommunication line circuit of the above type, but avoiding separate ringing detection means.

According to the invention this object is achieved due to the fact that it also includes a ringing generator able to supply ringing signals to said line and to said sensing circuit which is also able to sense said ringing signals.

In this way, also during a ringing phase the sensing circuit supplies an AC/DC output signal to the DC level detection circuit so that the latter may detect a line loop closure. Thus an optimal use is made both of the sensing circuit and of the detection circuit and substantially no additional circuitry is required.

In the above known line circuit use may be made of a sensing circuit such as described in Belgian Pat. No. 898,050. However, a relatively complicated structure is proposed in order that its output signal should be independent from longitudinal signals.

According to another characteristic feature of the present line circuit said sensing circuit includes a Herter bridge.

By the use of the latter the sensing circuit is considerably simpler.

BRIEF DESCRIPTION OF THE DRAWINGS

The above mentioned and other objects and features of the invention will become more apparent and the invention itself will be best understood by referring to the following description of a preferred embodiment taken in conjunction with the accompanying drawings wherein.

DESCRIPTION OF THE PREFERRED EMBODIMENT

In the following description, reference will be made to the Belgian Pat. Nos.:

898,049, describing various details of a SLIC and more particularly of a resistance synthesis circuit included therein;

898,050, describing a sensing circuit;

898,051, describing a polarity reversal circuit for a telecommunication line;

898,052, disclosing an impedance synthesis circuit;

897,771, describing a metering signal generator;

897,772, disclosing an electronic switch circuit;

897,773, describing a transcoder circuit;

898,959 and 898,960, disclosing details of a control circuit for a telecommunication circuit.

Reference will also be made to the Belgian patent application No. 2/60 362 filed on Feb. 28, 1985 as a patent of addition to Belgian Pat. No. 898,051.

Figure 1:
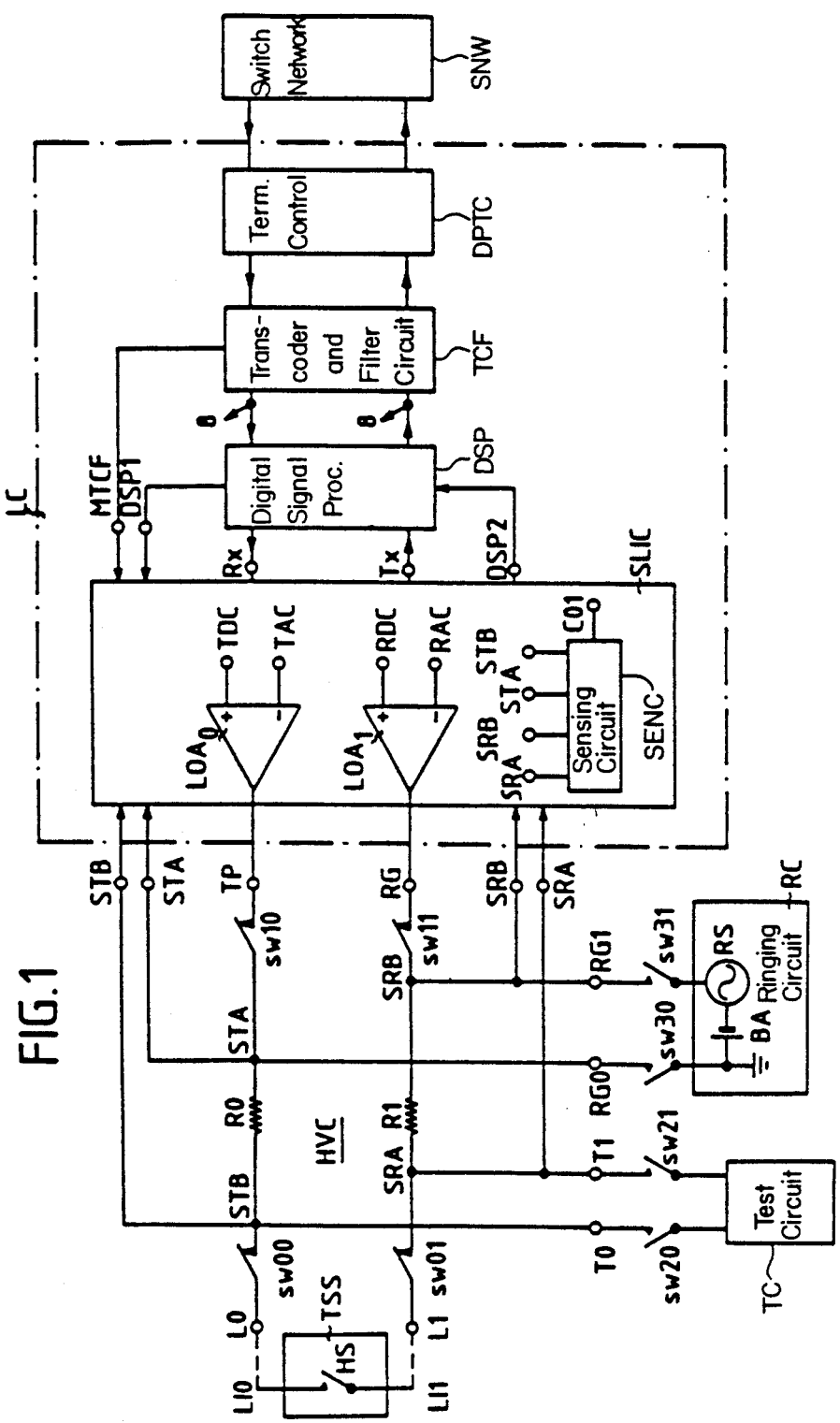
FIG. 1 shows a telecommunication circuit including a Subscriber Line Interface Circuit (SLIC) according to the invention.

The telecommunication circuit shown in FIG. 1 includes a line circuit LC which is connected in cascade with a switch circuit HVC between a tele-communication line with conductors LI0 and LI1, connected to a subset TSS, and a switching network SNW. Line circuit LC includes the cascade connection of a SLIC, a Digital Signal Processor DSP, a TransCoder and Filter circuit TCF and a Dual Processor Terminal Controller DPTC.

Subset TSS includes a normally open hook switch HS connected between the line conductors LI0 and LI1.

Switch circuit HVC is for instance of the type disclosed in Belgian Pat. No. 897,772. It includes 4 pairs of bidirectional switches sw00, sw01 to sw30, sw31 as shown and has line terminals L0 and L1 connected to line conductors LI0 and LI1 respectively, test terminals T0 and T1 connected to a test circuit TC, ringing terminals RG0 and RG1 connected to a ringing circuit RC, tip and ring terminals TP and RG connected to the like named outputs of line amplifiers LOA0 and LOA1 in the SLIC respectively and terminals STA, STB, SRA, SRB connected to like named terminals of a sensing circuit SENC in the SLIC. In HVC the line terminals L0/L1 are connected to TP/RG via the series connection of sw00/01, 50 ohms line feed resistors R0/1 and sw10/11 respectively. The respective junction points STB and SRA of sw00 and R0 and of sw01 and R1 are connected to TC via sw20 and sw21 respectively, whilst the respective junction points STA and SRB of R0 and sw10 and of R1 and sw11 are connected to RC via sw30 and sw31 respectively. As shown for a switched through connection, series switches sw00, sw01, sw10 and sw11 are closed, whereas the other shunt switches are open. These switches are controlled by the SLIC so that HVC is able to establish either one of the following connections: between TSS and SLIC (LOA0, LOA1 and SENC); TC and TSS: SLIC (LOA0, LOA1) and TC; RC and TSS; RC and SLIC (SENC). The function of TC is to test the connection to TSS and to the SLIC and that of RC is to apply a ringing signal to this line and to SENC in the SLIC. For instance, RC is able to connect ground through sw30 and the negative battery BA of $-48$ or $-60$ Volts in series with a ringing source RS of 90 Volts RMS through sw31.

The Subscriber Line Interface Circuit SLIC is a two-wire bidirectional circuit on the side of TSS and a four-wire one towards SNW. It has a speech receive input terminal Rx (with ground return) and a speech transmit output Tx (again with ground return), Rx and Tx being connected to DSP. The SLIC further has a 12 kHz or 16 kHz metering signal input terminal MTCF connected to TCF, data input and output terminals DSP1 and DSP2 connected to DSP and the above mentioned terminals STA, STB, SRA, SRB, TP and RG connected to HVC.

The digital signal processor DSP converts a digital speech signal received from TCF into an analog speech signal which is then applied to the speech receive terminal Rx of the SLIC. Conversely it converts an analog speech signal received via the speech transmit terminal Tx of the SLIC into a digital version which is applied to TCF. DSP also includes an echo canceller circuit. A plurality of drive bits are transmitted by DSP to data terminal DSP1 of the SLIC, as described in the above mentioned Belgian Pat. No. 898,049. One of these drive bits is a ringing bit RNG indicating that ringing is to be performed (1) or not (0). The DSP also receives on its data terminal DSP2 a plurality of control data bits transmitted by the SLIC. Two of these bits are:

SHD: a switch hook detection bit indicating that the line loop between the SLIC and TSS is open (0) or closed (1);

RT: a ring trip bit indicating that the ringing signal applied to the line by the circuit RC has to be removed (1).

The TCF performs a transcoding operation on digital signals received from the DSP and the DPTC and is also adapted to supply a metering signal MTCF to the SLIC. These operations are described in the Belgian Pat. Nos. 897,771 and 897,773.

Finally, the DPTC performs the general control of the SLIC. Details of this circuit are described in the Belgian Pat. Nos. 898,959 and 898,960.

To be noted that whereas HVC, SLIC and DSP are individually associated to the telephone line, the circuits TCF and DSP are provided in common for a number of such lines, e.g. 8 lines, as indicated by the multipling arrows.

Figure 2:
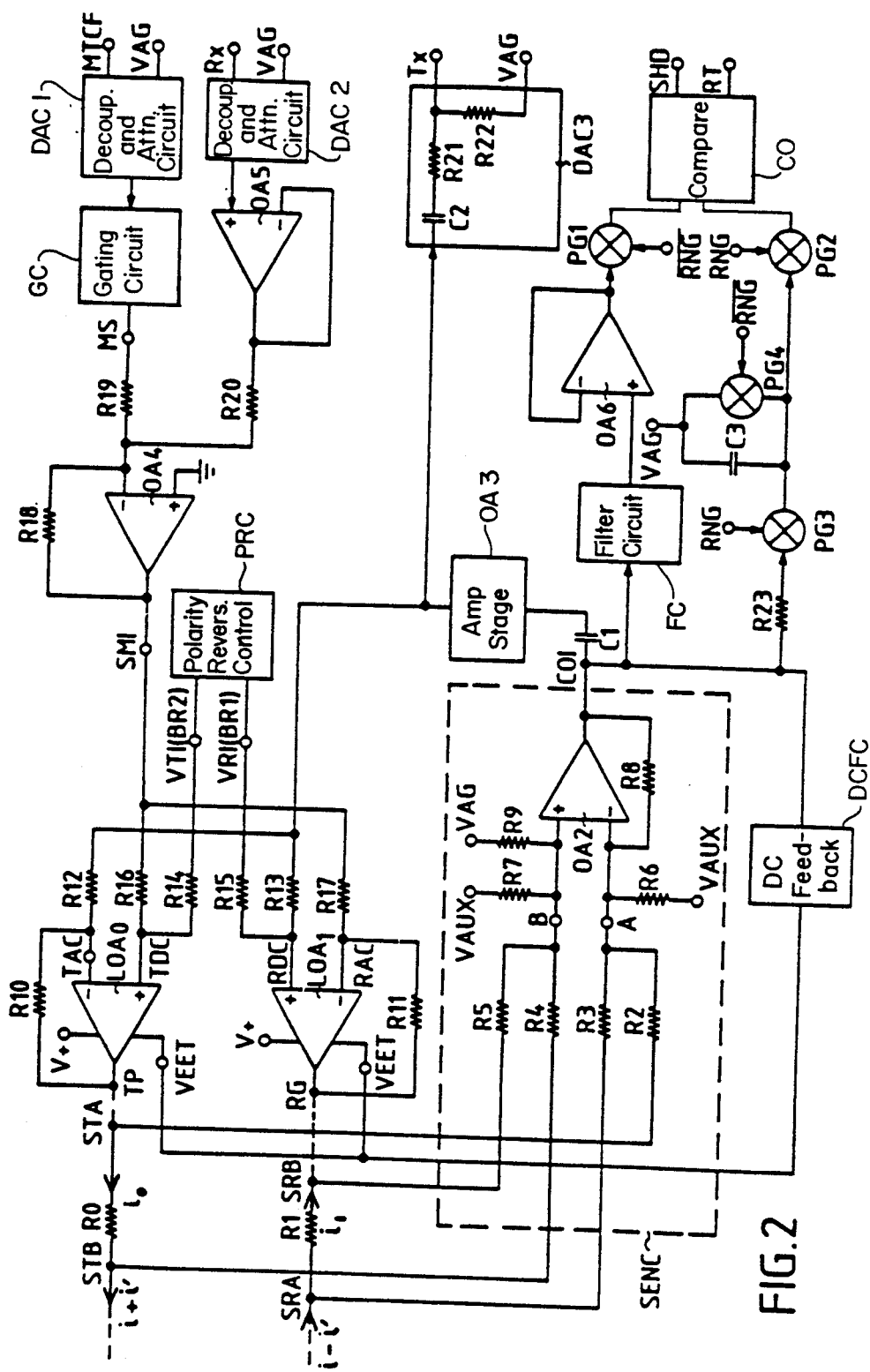
FIG. 2 represents this SLIC in more detail.

Reference is now made to FIG. 2 representing the SLIC of FIG. 1 in more detail.

This circuit operates with the following voltages:

V+ which is at 0 Volts or ground potential;

V− which is equal to $-48$ or $-60$ Volts e.g. $-48$ Volts;

VAUX which is an auxiliary voltage 15 Volts above V−, e.g. $-33$ Volts;

VAG which is a voltage half-way between V− and VAUX, i.e. substantially equal to 7.5 Volts above V−, e.g. −40.5 Volts;

VEET is a regulated voltage.

The tip and ring outputs TP and RG of the line amplifiers LOA0 and LOA1 are connected to the respective feed resistances R0 and R1. These, together with the potentiometers comprising the resistances R2, R3 and and R4, R5 constitute the Herter bridge already discussed and having output terminals A and B connected to the inverting and non-inverting inputs of a sensing means constituted by operational amplifier OA2. The latter inputs are also connected to VAUX via respective bias resistances R6 and R7. The inverting input of OA2 is further connected to its output through feedback resistance R8, whilst its non-inverting input is further connected to VAG via bias resistance R9.

The output CO1 of operational amplifier OA2 is connected to the inputs VEET of both LOA0 and LOA1, which have respective feedback resistances R10 and R11, through a DC feedback circuit DCFC which together with the amplifiers LOA0 and LOA1, the feed resistances R0 and R1 and the sensing circuit SENC constitutes a resistance synthesis circuit similar to the one disclosed in Belgian Pat. No. 898,049, i.e. a circuit to convert the value of each of the feed resistances R0 and R1 into a wanted resistance value.

The output CO1 of the sensing circuit SENC is also connected via a DC blocking capacitor C1 in series with an amplifier stage OA3 including an operational amplifier, on the one hand to the inverting input TAC of LOA0 via resistance R12 and, on the other hand, to the non-inverting input RDC of LOA1 through resistance R13. The amplifiers LOA0 and LOA1, the resistances R0 and R1, the sensing circuit SENC, the amplifier stage OA3 and the resistances R12 and R13 constitute an AC impedance synthesis circuit able to convert the resistance value of R0 and R1 into a wanted AC impedance.

It should be noted that this AC impedance loop has certain simularities with the one disclosed in the above mentioned Belgian Pat. Nos. 898,052 and 898,049, but essentially differs therefrom in that it includes a Herter bridge and that the feedback control of LOA0 and LOA1 is a voltage control and not a current control.

The inputs TDC of LOA0 and RDC of LOA1 are also connected through resistances R14 and R15 to the respective outputs VTI (BR2) and VRI (BRI) of a polarity reversal circuit PRC of the type disclosed in the above mentioned Belgian patent application No. 2/60362 which is a patent of addition to Belgian Pat. No. 898,051. As disclosed in this application the circuit PRC is able to apply a DC supply voltage V+ minus X to VTI (BR2) and a DC voltage VEET plus X to VRI (BR1) (BR1) or vice-versa, x being a voltage which comprises a fixed part and a variable part which is function of the amplitude of the metering signal applied to input terminal MTCF of the SLIC.

The inputs TDC of LOA0 and RAC of LOA1 are connected to the output SMI of an operational amplifier OA4 via respective resistances R16 and R17. This amplifier has a negative feedback resistance R18 and a grounding non-inverting input. The above mentioned outputs MTCF of TCF and Rx of DSP are connected to the inverting input of OA4 in a way similar to the one disclosed in the above mentioned Belgian Pat. No. 898,049. MTCF is connected to OA4 via a decoupling and attenuator circuit DAC1, a gating circuit GC and a resistance R19 in series, and Rx is connected to OA4 via a decoupling and attenuator circuit DAC2, similar to DAC1, an isolating unity gain amplifier OA5 and resistance R20 in series. As described in the last mentioned Belgian patent the gating circuit GC is controlled by a bit SPMI indicating that a metering signal appearing on MTCF has to be entered in the SLIC or not.

The output of the amplifier stage OA3 is also connected to the transmit output Tx, VAG via a decoupling and attenuator circuit DAC3 similar to DAC1 and DAC2. Because these circuits are similar, only DAC3 is shown in detail. It comprises, considered from the input to the output, a series capacitance C2 followed by a voltage divider constituted by the series resistance R21 and the shunt resistance R22 one end of which is connected to VAG whilst the junction of the resistances is connected to the live transmit terminal Tx.

Finally, the output CO1 of OA2 is also connected to a comparator C0, on the one hand via the series connection of a filter circuit FC to eliminate metering signals from the input signal applied to it, an isolating unity gain amplifier OA6 and a passing gate PG1, unblocked by $\overline{RNG}$ i.e. the inverse of the ringing bit RNG, and, on the other hand, through the series connection of a filter circuit for filtering a ringing signal and preventing the comparator C0 to react to spikes, and a passing gate PG2 unblocked by the ringing bit RNG. The last filter comprises a series resistance R23 and a shunt capacitance C3. R23 and C3 are interconnected through a passing gate PG3 unblocked by RNG, whilst C3 is shunted by passing gate PG4 unblocked by $\overline{RNG}$. The branch FC, OA6 and PG1 in cooperation with C0 serves to detect the closure of switch HS in TSS when there is no ringing and then provide a switch hook signal SHD on the like named output SHD of C0. The other branch R23, PG3, C3, PG4, PG2 in cooperation with C0 serves to detect the closure of HS in TSS during a ringing operation and then generate a ring trip signal RT at the like named output RT of C0.

Values of some of the above resistances and capacitances can be as follows:

R0, R1: 50 ohms;
R2 to R5: 60 kilo-ohms;
R6, R7: 10 kilo-ohms;
R8, R9, R12, R13, R16, R17, R19: 30 kilo-ohms;
R10, R11, R14, R15: 150 kilo-ohms;
R18, R20: 50 kilo-ohms;
R23: 170 kilo-ohms;
C1, C3: 470 nano-Farads.

The capacitances C2 and the resistances R21 and R22 have values which are dependent on the use of the telecommunication circuit, e.g. national requirements.

Before describing the general operation of the telecommunication circuit the sensing circuit SENC comprising the Herter bridge R0-R5 and the associated detection device constituted by the operational amplifier OA2 as well as and the resistances R6-R9 will be considered.

This amplifier has an input stage operating between V− and V+ and an output stage operating around VAG and between V− and VAUX. With the above given values this means that the input stage of OA2 operates between −48 Volts and 0 Volts, whereas its output stage functions between −7.5 Volts and 7.5 Volts with respect to VAG (−40.5 Volts).

When calling:

V1, V2, V3 and V4 the AC/DC voltages respectively generated at the terminals STA, STB, SRA, SRB of the feed resistances R0 and R1 by an AC/DC current I flowing therein;

V the equal common mode voltages appearing at the inverting and non-inverting inputs A and B of the operational amplifier OA2;

V5 the voltage at the output CO1 of OA2, the following equation may be written:

$$\frac{V2 - V}{R4} + \frac{V4 - V}{R5} + \frac{VAUX - V}{R7} = \frac{V - VAG}{R9} \quad (5)$$

$$\frac{V3 - V}{R3} + \frac{V1 - V}{R2} + \frac{VAUX - V}{R6} = \frac{V - V5}{R8} \quad (6)$$

Subtracting these equations indicates that V5-VAG, the output voltage of OA2 considered with respect to VAG, can be independent of both V, the common mode input voltage of OA2, and VAUX provided:

the values of the resistances R6 and R7 are chosen equal;

the values of the resistances R8 and R9 are chosen equal;

the values of the resistances R2 to R5 are chosen equal.

With the thus chosen resistances, the output voltage V5−VAG and the voltage V are given by the following equations:

$$V5 - VAG = (V2 - V1 + V4 - V3) \cdot \frac{R8}{R2} \quad (5')$$

$$V\left(\frac{2}{R2} + \frac{1}{R8} + \frac{1}{R6}\right) = \frac{V2 + V4}{R2} + \frac{VAG}{R8} + \frac{VAUX}{R6} \quad (6')$$

Thus, as desired for the impedance synthesis using the feedback loops, the output voltage of OA2 given by (5') is directly proportional to the sum of the potential drops across R0 and R1.

As mentioned above, the ringing circuit RC shown in FIG. 1 is able to apply a ground to switch sw30 and a 90 Volts RMS ringing voltage superimposed on a −48 Volts DC voltage to switch sw31. As a result $$V5 - VAG = R0 \cdot I \quad (7)$$

with $$I = \frac{V1 - V4}{2R + R0} \quad (8)$$

The DC portion of this current flows exclusively through the bridge resistances R2 to R5, whereas the AC portion mainly flows through TSS because the latter offers an AC impedance which is much smaller than that offered by the resistances R2 to R5 having the high values given above. In practice, there may be produced across R0 and R1 a voltage V2−V1=V4−V3=12 Volts peak to peak so that V5−VAG=24R8/R2 Volts peak to peak Because the output stage of the operational amplifier OA2 operates between +7.5 Volts and −7.5 Volts with respect to VAG, the ratio R8/R2 has been chosen equal to $\frac{1}{4}$, so that V5−VAG varies between +6 Volts and −6 Volts as a maximum and that there is no danger of saturating this output stage.

On the other hand, with a gain factor equal to R8/R2=$\frac{1}{4}$ the magnitude of the low voltage speech signal sensed by the SENC and generated at the output of this circuit is still sufficient to be used in the resistance and impedance synthesizing circuits.

For the above resistance values the equation (5') and (6') become:

$$V5 = VAG + \frac{V2 - V1 + V4 - V3}{2} \quad (9)$$

and $$V = \frac{V2 + V4 + 6VAUX + 2VAG}{10} \quad (10)$$

With the above resistance choice the sensing circuit is still not able to correctly process the above high voltage ringing signal. Indeed, from the above equations (6') and (10) it follows that without the connections of the inputs of the amplifier OA2 to VAUX, the common mode voltage V at these inputs has a value V' give by $$V'\left(\frac{2}{R2} + \frac{1}{R8}\right) = \frac{V2 + V4}{R2} + \frac{VAG}{R8} \quad (11)$$

or $$V' = \frac{V2 + V4 + 2VAG}{4} \quad (12)$$

For certain values of the ringing voltage the voltage V' may be outside the operating range 0, −48 Volts of the input stage of the operational amplifier OA2. The purpose of the connections of the inputs of OA2 to VAUX via the respective resistances R6 and R7 is to bring the common mode voltage V given by the above equations (6') and (10) within this operating range This is realised because as soon as the above voltage V' is different from VAUX a current starts flowing from or to VAUX via the resistances R6 and R7 so as to establish a common mode voltage V having a value comprised between V' and VAUX. This is also follows from the comparison of the above relations (6') and (11) or (10) and (12) because V is smaller or larger than V' depending on V' being smaller or larger than VAUX.

The resistances R2 to R9 have been so calculated that even for the most severe ringing conditions the value of V remains within the above operating range. Indeed, from the equation (12) it follows that the outer limits −48 and 0 of the above mentioned range are reached when V2+V4 is equal to −200 Volts and +279 Volts respectively. These values do not occur in practice. In the above mentioned worst ringing case for which V1=0 Volts (and hence wherein V2 is about 0 Volts) and V4=−174 Volts, the value V' calculated by means of the equation (10) is equal to −63.75 Volts Volts since VAG=−40.5 Volts, as mentioned above. This value V' becomes equal to V=−45.3 Volts, as follows from the above equation (12), due to the presence of the connections to VAUX.

It should be noted that the value of resistance R6 is chosen smaller than that of resistance R8 in order that more current should be derived to VAUX than to VAG from a predetermined value of V onwards. This value is equal to

V=3VAUX−VAG/2

This is done in order that VAG which is a reference voltage for all the circuits SLIC, DSP, TCF and DPTC should be as little influenced as possible.

From the above it follows that in the sensing circuit SENC use has been made of a Herter bridge so that an output voltage V5—VAG is produced which is independent from common mode or longitudinal signals. But additionally the gain factor R8/R2 of the sensing circuit SENC has been chosen so as to prevent saturation of the output stage of OA2, and the connections of the inputs of OA2 to VAUX have been provided to reduce the common mode voltage V applied to these inputs, thereby preventing saturation of the input stage of OA2.

The general operation of the telecommunication circuit will now be described.

In the rest condition of this circuit the inverse of the ringing bit $\overline{RNG}$ is on 1, i.e. RNG=1, so that the capacitance C3 is shorted through passing gate PG4 and that passing gate PG1 is closed, whereas passing gates PG2 and PG3 are open.

When the subset TSS has to be called, the DSP communicates the ring bit RNG=1 to the SLIC via the connection DSP1 and the HVC is controlled in a way (not shown) such that it opens the switches sw10 and sw11 and closes the switches sw30 and sw31. As a consequence RC applies the above mentioned AC/DC ringing signal to the terminals STA and SRB of the sensing circuit SENC. No DC current can flow to the subset TSS because the switch hook contact HS is still open, but the AC ringing signal operates the ringer in this subset and thus informs the subscriber that he is being called. The AC/DC ringing signal, with a small DC portion, appears as a signal V5 at the output CO1 of the sensing circuit SENC and is applied, first to LOA0 and LOA1 via OA3 but this has no effect since sw10 and sw11 are open, secondly to the branch leading to the comparator C0 and including PG1 but this has also no effect since PG1 is open due to RNG=1, and thirdly to the same comparator C0 via the filter circuit R23, PG3, C3, PG4 and PG2 because passing gates PG2 and PG3 are closed, whereas passing gate PG4 is open. This filter circuit is essentially provided to prevent spikes from operating the comparator C0 and to reduce the amplitude of the ringing signal applied to it.

When the switch hook contact HS is closed in the subset TSS, a DC current, and not solely an AC one, is able to flow from the ringing circuit RC through a low resistance path in the TSS and thus produces an additional considerable DC voltage drop in the feed resistances R0 and R1 as a consequence of which the DC level of the output signal V5 of the sensing circuit SENC suddenly increases. This DC increase is detected by the comparator circuit C0 which accordingly activates its output RT. The condition 1 of the ring trip bit RT is then communicated via the connection DSP2 to the DSP, as a consequence of which the HVC is controlled in such a way that it closes the switches sw10 and sw11 and opens the switches sw30 and sw31. Due to this, the ringing signal in RC is removed from the line.

As soon as the switch hook contact HS and switches sw10 and sw11 are closed the DC output voltages V+ minus x and VEET plus x generated by the polarity reversal circuit PRC are applied to the respective line conductors LI0 and LI1 via the line amplifiers LOA0 and LOA1 wherein these signals are amplified by the factors R10/R14 and R11/R15 respectively. With the above given values R10/R14=R11/R15=1.

Also, speech or other signals may then be exchanged between the called TSS shown and a calling TSS coupled to the receive and transmit terminals Rx and Tx via SNW, DPTC, TCF and DSP. A speech signal from the TSS shown flows through resistances R0 and R1, sensing circuit SENC, capacitance C1, amplifier stage OA3 and network DAC3 to the transmit terminal Tx. Speech signals or other from the distant TSS are received on the receive terminal Rx and are applied to the output terminal SMI of OA4 via DAC2, OA5 and R20 in series. In OA4 this signal is amplified by a factor equal to R18/R20, or 1 with the about given values. From OA4 this unbalanced signal is applied in push-pull with opposite phases to the line amplifiers LOA0 and LOA1 since it is simultaneously coupled to the non-inverting and inverting inputs TDC and RAC of these amplifiers. This signal is amplified by the factor R10/R16 in LOA0 and R11/R17 in LOA1 before being applied in a balanced way between the line conductors LI0 and LI1. With the above given values R10/R16=R11/R17=2.5.

A metering signal possibly applied to the input terminal MTCF of the SLIC is applied to the output SMI of OA4 via gating circuit GC, which has previously be unblocked, and OA4 and from there to the line via the amplifiers LOA0 and LOA1 in the same way as described for the speech signal. However, in OA4 the metering signal is amplified by a factor equal to R18/R19, or 5/3 with the above given values of R18 and R19.

From the above it follows that a speech signal or a combined speech/metering signal superimposed on a DC loop current may flow in the line and hence in the feed resistances R0 and R1. This combined AC/DC current is detected by the sensing circuit SENC which provides at its output the voltage V5 given by the equation (5) or (9). This output voltage V5 is applied to the DC feedback circuit DCFC wherein it is converted into a DC regulating voltage VEET connected to the like named voltage supply inputs VEET of the line amplifiers LOA0 and LOA1 which together with resistances R0, R1 and DCFC constitute a resistance synthesis circuit. The regulation of VEET corresponds to a conversion of each of the resistances R0 and R1 to a wanted resistance, as already explained in the above mentioned Belgian Pat. No. 898,049.

The output voltage V5 of the sensing circuit SENC is also used in an AC impedance synthesis circuit. Indeed, after DC has been removed from this output voltage by the capacitance C1 the resultant AC signal is applied via the amplifier stage OA3 to the line amplifiers LOA0 and LOA1. Amplifier stage OA3 may consist in an operational amplifier part of an overall SLIC integrated circuit design but with external components to determine the wanted complex impedance, e.g. a series input resistance and a feedback impedance comprising a resistance in series with another resistance shunted by a capacitance. Application of the OA3 output signal to LOA0 and LOA1 happens with opposite phases since the output of OA3, wherein V5 is multiplied by a wanted function, is connected to the inverting input TAC of LOA0 via resistance R12 and to the non-inverting input RDC of LOA1 through resistance R13. This AC feedback voltage signal is thus subtrated from the speech/metering voltage signal applied also with a opposite phases to the other inputs of these amplifiers via OA4, and the resulting error voltage signals after amplification by a gain factor R10/R12+R11/R13, appears as a balanced push-pull signal between the line conductors LI0 and LI1.

With $-k1=R8/R2$ and $-k2$ the respective gain factors of SENC and OA3, the feedback voltage at the output of OA3 is equal to k1 k2 V'5 wherein V'5 is the AC portion of the above mentioned sensed speech/metering voltage. When this feedback signal is applied with opposite phases to both LOA0 and LOA1 which have a gain factor equal to $k3=R10/R12+R11/R13$ each of the resistances R0 is converted into an impedance $$R0 (1+2\, k1\, k2\, k3) \qquad (13)$$

the factor 2 resulting from the push-pull effect. Thus the total feed resistance R0+R1 is converted into the impedance $$2R0 (1+2\, k1\, k2\, k3) \qquad (14)$$

when R0=R1.

From the above it follows that the Herter bridge R0-R5 is arranged at the junction of the unidirectional transmission and receive paths Tx and Rx and the bidirectional line LI0, LI1 and that it is used for the transmission of speech signals as well as of ringing signals although the latter have a much higher amplitude than the former. It is used, in combination with the comparator C0, for the detection of the closure of a hook switch contact during ringing or other instants. Finally, it is also used both in a resistance and in an impedance synthesis circuit.

While the principles of the invention have been described above in connection with specific apparatus, it is to be clearly understood that this description is made only by way of example and not as a limitation on the scope of the invention.

We claim:

1. Telecommunication line circuit for interfacing a bidirectional 2-wire subscriber line to an exchange circuit having a receive leg and a transmit leg, said line circuit comprising:
    a ringing generator;
    a first operational amplifier having a non-inverting input, an inverting input and an output;
    a feedback resistance coupling the first operational amplifier's output to its inverting input;
    a first bias source;
    first and second bias resistances of equal value;
    a Herter bridge having
        a first pair of terminals coupled to the bidirectional 2-wire line,
        a second pair of terminals coupled to the receive leg of the exchange circuit and via first switching means to said ringing generator,
        two equal-valued first Herter bridge resistances each connecting a terminal of said first pair of terminals to a respective terminal of said second pair of terminals,
        a third pair of terminals coupled to the transmit leg of the exchange circuit via said first operational amplifier as well as to said first bias source through said first and second bias resistances, respectively, and
        four equal-valued second Herter bridge resistances each connecting a terminal of said third pair of terminals to a respective terminal of each of said first and second pairs of terminals;
    a second bias source, and
    a third bias resistance connecting the first operational amplifier's non-inverting input to said second bias source,
wherein;
    said first and second bias resistances are of equal value;
    said third bias resistance and said feedback resistance are of equal value; and
    the resistance of said feedback resistance is sufficiently low relative to that of said first Herter bridge resistances to prevent saturation of an output stage of the first operational amplifier and the resistance of the first bias resistance is sufficiently low relative to that of said feedback resistance to prevent saturation of an input stage of the first operational amplifier upon a ringing signal being applied across said second pair of terminals by said ringing generator.

2. Telecommunication line circuit according to claim 1, wherein the third pair of terminals of the Herter bridge are also coupled to AC and DC feedback circuits responsive to series feed resistances forming part of the Herter bridge.

3. Telecommunication line circuit according to claim 2 wherein the voltage output at the third pair of terminals is proportional to voltages across the series fed resistances.

4. Telecommunication line circuit according to claim 1, wherein (a) the value of said second bias source constitutes a reference output of said first operational amplifier in the absence of a sensed signal, (b) and the value of said first bias source and of said first, second, and third bias resistances are such that above a predetermined voltage value more current flows from said non-inverting input towards said first bias source than towards said second bias source.

5. Telecommunication line according to claim 1, wherein the output of said operational amplifier is selectively coupled to a DC level detection circuit through a signal path which includes a filter circuit for said ringing signal and which is unblocked upon said ringing signal being applied across said second pair of terminals.

6. Telecommunication line circuit according to claim 5, wherein the output of said first operational amplifier is also coupled to said DC level detection circuit through a second signal path, which is unblocked when no ringing signal is applied across said second pair of terminals.

7. Telecommunication line circuit according to claim 1, wherein said receive leg is coupled to respective first push-pull inputs of two operational line amplifiers whose outputs are coupled to respective ones of said second pair of terminals and the output of said first operational amplifier is capacitively coupled to respective second push-pull inputs of said two operational line amplifiers, whereby an AC impedance may be synthesized.

8. Telecommunication line circuit according to claim 7, wherein the output of said first operational amplifier is capacitively coupled to said second push-pull inputs through an operational amplifier stage including an impedance network for determining the desired AC impedance to be synthesized.

9. Telecommunication line circuit according to claim 8 wherein the output of said operational amplifier stage is coupled to said transmit leg.

10. Telecommunication line circuit according to claim 7, wherein the output of said first operational amplifier is coupled to voltage supply inputs of said two operational line amplifiers whereby a resistance may be synthesized.

11. Telecommunication line circuit according to claim 1, further comprising second switching means to disconnect said second pair of terminals from said receive leg when said first switching means connect said ringing generator to said second pair of terminals.

* * * * *

UNITED STATES PATENT AND TRADEMARK OFFICE
CERTIFICATE OF CORRECTION

PATENT NO. : 4,837,818

DATED : June 6, 1989

INVENTOR(S) : Jozef F.P. Pieters; Pierre-Paul F.M. Marie Guebels

It is certified that error appears in the above-identified patent and that said Letters Patent is hereby corrected as shown below:

In the Specification:

| | |
|---|---|
| Column 2 Line 45 | Change "potentio-meter" to -- potentiometer --. |
| Column 5 Lines 40, 41 | Change "tele-communication" to -- telecommunication --. |
| Column 6 Line 59 | Change "multipling" to -- multiplying --. |
| Column 7 Line 9 | Delete "and". |
| Column 10 Line 19 | Change "give" to -- given --. |
| Column 10 Line 36 | After "range" insert a period. |
| Column 10 Line 41 | Afer "this" delete the "is". |
| Column 10 Line 56 | Delete the second "Volts". |
| Column 12 Line 10 | After "signals or other" insert -- signals --. |
| Column 12 Line 14 | Change "about" to -- above --. |

UNITED STATES PATENT AND TRADEMARK OFFICE
CERTIFICATE OF CORRECTION

PATENT NO. : 4,837,818

DATED : June 6, 1989

INVENTOR(S) : Jozef F.P. Pieters; Pierre-Paul F.M. Marie Guebels

It is certified that error appears in the above-identified patent and that said Letters Patent is hereby corrected as shown below:

Column 12 Line 25 — After "previously" change "be" to -- been --.

Column 12 Line 66 — Change "a opposite phases" to -- opposite phase --.

Column 13 Line 31 — Change "instants" to -- instances --.

Signed and Sealed this

Fifteenth Day of May, 1990

Attest:

HARRY F. MANBECK, JR.

Attesting Officer

Commissioner of Patents and Trademarks